INVENTOR.
Harold F. Silver
BY
ATTORNEYS

March 4, 1958     H. F. SILVER     2,825,147
COMPACT DRIER
Filed Nov. 8, 1954     2 Sheets-Sheet 2
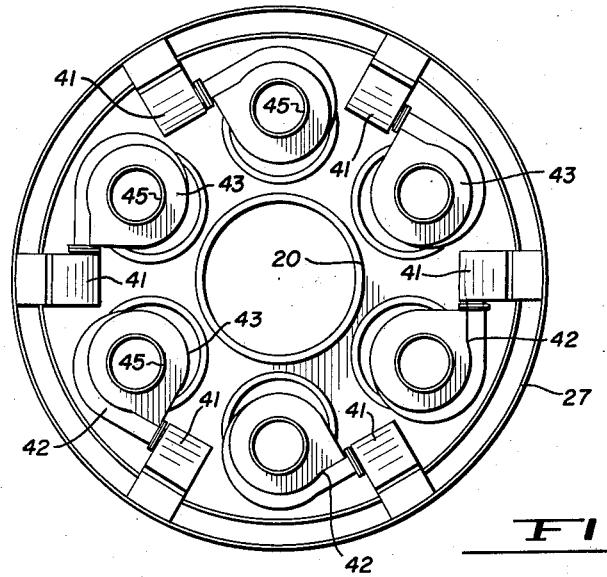
FIG. - 2
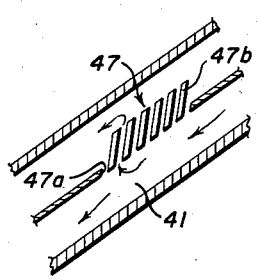
FIG. - 5
FIG. - 4
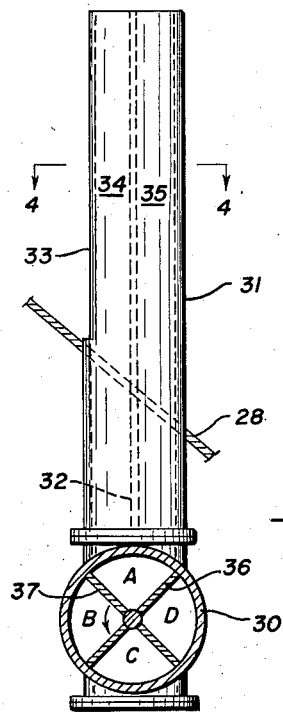
FIG. - 3
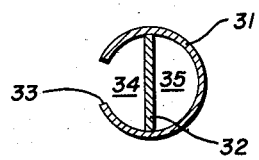
INVENTOR.
Harold F. Silver
BY
ATTORNEYS

United States Patent Office 2,825,147
Patented Mar. 4, 1958

2,825,147

COMPACT DRIER

Harold F. Silver, Denver, Colo., assignor to Silver Engineering Works, Inc., a division of Silver Corporation, Denver, Colo., a corporation of Colorado Application November 8, 1954, Serial No. 467,289

3 Claims. (Cl. 34—57)

This invention relates to driers and more particularly to fluidized or gas entrained driers in which a finely divided wet solid is entrained and dried in a high velocity stream of hot, dry gas.

Fluidized or gas entrained drying is a well known system of drying finely divided materials. The system, in general, utilizes a source of a hot drying gas, a drying chamber, and several separators for separating dried product and dust from the spent drying gas. In one form, for drying low rank carbonaceous fuel, the hot gaseous products of combustion from a furnace are used as the drying medium. To provide an economical process, a very large amount of coal must be dried, which, of course, requires large equipment. Such large equipment requires a substantial amount of space, both horizontally and vertically.

According to the present invention there is provided a compact drier which incorporates the drying chamber and the separators in one housing. The device includes a novel primary separator for separating dried product from the spent drying gas and suspended fines or dust. The single housing provides means for maintaining a temperature above the moisture condensation point of the spent gas, recirculating gas and dust.

Included among the objects and advantages of the present invention is a compact fluidized drier having an integrated drying chamber and separator system. A novel separator is provided for separating all but the finest particles from a suspension of dust in a stream of gas. The invention, also, includes novel means for discharging dust or finely divided solids from a bin or hopper.

These and other objects and advantages of the invention may be more readily ascertained by referring to the following description and appended drawings in which:

Fig. 2 is a sectional view of the drying assembly taken along line 2—2 of Fig. 1;

Fig. 3 is an enlarged detail of a star feeder system according to the invention;

Fig. 4 is a plan view of the feeder device of Fig. 3 taken along line 4—4; and

Fig. 5 is an enlarged detail of a dust stripper according to the invention.

Figure 1:
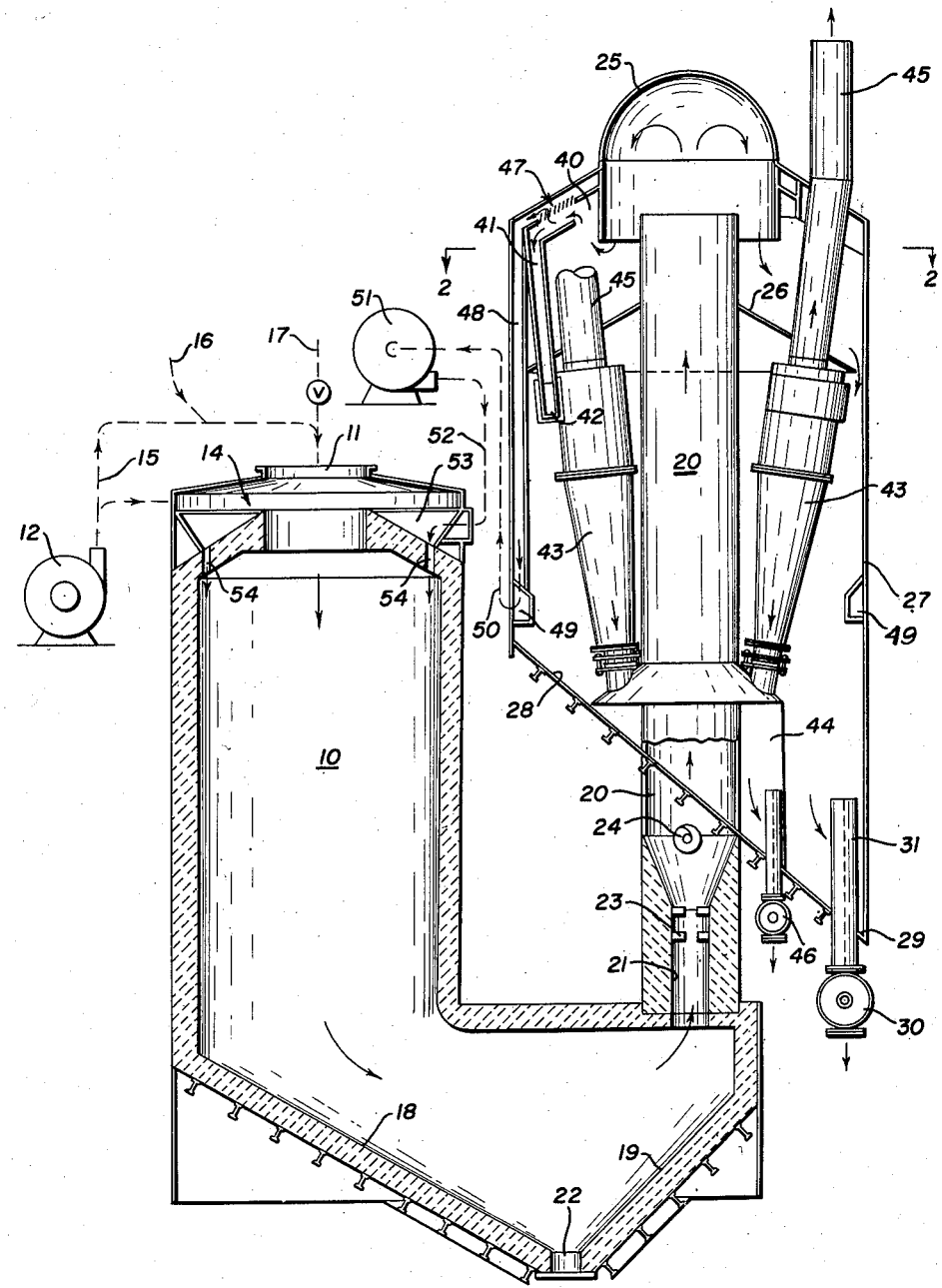
Fig. 1 is an elevation view, in partial section, of a device of the invention showing the integrated drying assembly.

In the device illustrated, a down-draft furnace 10 supplies hot gases of combustion for drying material in a drier. A burner 11, not shown, which may be any suitable powdered coal burner, is placed on top of the furnace 10 and the flame therefrom is directed downwardly into the furnace. Fresh air for combustion is supplied by a forced draft fan 12 which blows air into chamber 14. The chamber 14 communicates with the burner 11 at the top of the furnace. A conduit 15, which is shown schematically, is used to pick up coal dust or fines from a conduit 16, and directs the coal and air into the burner 11. For starting the furnace, oil may be directed into the burner through line 17, and when coal dust is available for burning, the use of oil may be discontinued. Fresh air is normally used in duct 16 to convey coal dust to the furnace, but spent gas or a mixture of fresh air and spent gas may be used where desired.

The hot gases of combustion from furnace 10 sweep downwardly and impinge on bottom wall 18. The gases are turned away from the bottom wall 18 into wall 19 where they are directed upwardly into a drier 20 through a narrow throat 21. The change of direction of the gas at the lower portion of the furnace throws out a substantial portion of solid matter which may be suspended in the gas, and an ash disposal means 22 is provided in the lowest part of the furnace. The high velocity gas stream, which is directed into the drier, first passes a series of baffles 23 in the drying chamber 20. Wet, finely divided coal is charged into the drying chamber by means of a screw conveyor feed 24. The wet coal is dispersed and suspended in the high velocity gases.

The suspended wet coal particles pass upwardly through the drying chamber 20, and are dried by contact with the hot gas. The mixture of gas and substantially dry coal is discharged from the drying chamber 20 into a dome 25 which is positioned above the drier 20. The mixture of gas and solid is directed downwardly by the hemispherical dome 25, substantially in adverse direction from its travel in the drying chamber 20. The gas and coal mixture passes downwardly around the drying chamber 20 into a chamber 40. Gas exhausts from the chamber 40 through a duct or conduit 41, which has its inlet at the top of the chamber. The mixture entering the substantially closed chamber 40 from the dome 25 is traveling downwardly and it makes a reverse turn upwardly toward the inlet opening of duct 41. This change of direction of the mixture in the chamber 40 tends to throw out all but the finest particles and dust from the gas-dry coal mixture. The separated particles fall onto an annular shield 26, encircling the drying chamber 20. The shield 26 aids in reversing the mixture of gas and solid, and prevents a direct gas passage into product bin 27 therebelow. The shield 26 is placed in the chamber at an angle to the horizontal which is slightly greater than the angle of repose of the dried product. The acute angle prevents a build up of particles, and the flow of gas above the shield, also, helps prevent such a build up. The separated product flows along the shield 26 into the product bin or hopper 27, which is a concentric chamber around the drying chamber. The bottom 28 of the product bin 27 slopes to a single low point 29 where product is removed from the chamber by means of a star feeder 30. The internal surfaces of the separator assembly are designed to prevent a build up of dried material thereon.

The unseparated dust and spent gas, which passes from chamber 40 into conduits 41, is conveyed into a tangential inlet 42 of a cyclone dust separator 43. Normally, a series of dust separators are required to accommodate the spent gas volume. Dust is separated from the spent gas in the separators 43 and falls into dust bin 44, and the spent gas passes up and out of the separators through exhaust stacks 45. Dust from the bin 44 is withdrawn from the bin by means of a star feeder 46, and may be conveyed to the furnace as fuel. The dust cyclones 43 are preferably very efficient separators so that the spent gas passing out through the stacks 45 is substantially clean. One or more exhaust stacks 45 may be used for the separators 43.

The star feeder 30, which is a conventional sector vane star feeder, is interconnected to the hopper by means of a divided, slotted pipe 31. The dried, finely divided coal, and substantially any product which is dried in the particular type of drying system, is a very finely divided solid and has a definite tendency to pack in the bin. The dried, finely divided matter, due to its packing tendencies, does not readily and evenly feed into the star feeder. The characteristics of the powdered mass does not permit gas or gas bubbles to readily pass, as for example in a liquid. In feeding a star feeder, as a sector rotates, it engages the opening which communicates with the bin, and finely divided matter drops into the sector. The sector, however, is full of gas which must be removed before the sector can be filled with solid matter. According to the invention, a divided pipe is provided which removes gas from a sector and permits it to fill substantially full of finely divided material. A charging tube 31 is divided by a partition 32, and the tube connects the bin 27 to the star feeder 30. A filling side 34 of the divided pipe has a slotted opening 33 which communicates into the product bin 27. The other side 35, likewise, communicates with the bin, but has only a top opening. The opening of tube 35 extends above the maximum height of contained material, or it may be vented exteriorly of the bin. The star feeder rotates counterclockwise, and as sector A comes into communication with tube 34, dry product or dust or other finely divided material, as the case may be, drops into the chamber A. The front partition 37 of sector A, during counterclockwise rotation, passes partition 32 so that sector A communicates with tube 34 and with the bin 27. Divided material from tube 34 flows into sector A, and the replaced gas from the sector exhausts through tube 35. Sector A may, therefore, be filled without interference from trapped gas. The sector is substantially filled when the vane 36 passes partition 32. The process repeats for the following sector D as the vane 36 approaches the tube 34 so that material flows into sector D. The sectors C and B in turn are filled as they rotate past the filling tube. As each sector approaches the bottom, during rotation of the star feeder, the product therein is dropped into a conveying system, which may be a pneumatic conveying system, belt conveyer, etc. The star feeder system is useful for any powdered or ground material which discharges from a bin through a bottom gravity discharge.

In certain installations it is desirable to recirculate a portion of the spent drying gas, as from the separator back into the furnace so that the temperature of the drying gas may be controlled. The recirculating gas, furthermore, provides volume for the drying gas without adding additional oxygen which could support combustion. In the drying of coal if too great a proportion of oxygen is permitted in the drying medium, explosions in the drying chamber may result, since the gas may be passed into the drying chamber well above the combustion point of coal. To provide substantially clean spent gas, a series of dust strippers, shown generally by numeral 47, are placed in the chamber 40. The strippers 47 comprise an opening 47a in the top surface of conduit 41, and a series of substantially upright vanes 47b. The vanes 47b provide a series of openings which permit the gas to pass into conduit 48, and in so passing the vanes the gas must make a substantial turn throwing out the larger particles of dry solids suspended in the gas. Spent gas which passes through the strippers 47 flows into conduits 48 and then into a manifold 49 around the primary separator. A conduit 50, shown in schematic illustration, passes the gas from manifold 49 to a recirculating fan 51. A conduit 52, also, shown schematically, conveys gas from fan 51 into furnace manifold 53 which extends around the outer part of the top of the furnace. The spent gas passes from manifold 53 into the furnace through downwardly directed inlet ports 54 which are spaced from the vertical wall of furnace. The spent gas is passed downwardly along the wall of the furnace to keep it out of the initial combustion zone where it might interfere with combustion in the burner, and, also, to help protect the wall by providing a shield of relatively cooler gas immediately next the wall.

While the invention has been illustrated by reference to a specific illustration, there is no intent to limit the invention to the precise details so described, except insofar as set forth in the appended claims.

I claim:

1. In a device of the class described, a substantially vertical drying column having a lower inlet for a stream of high velocity drying gas and an upper discharge outlet, means adjacent and above said inlet for introducing finely divided solids to be dried into said stream whereby gas and entrained solid is directed upwardly through said column, an upper dome separating means mounted adjacent the upper outlet for reversing the direction of flow of gas and solid from said outlet and separating product from said gas stream, product bin means encompassing a substantial portion of said column and interconnected with said dome separating means for collecting product separated from said gas stream, a discharge outlet for product at a lowermost point in said product bin, a plurality of cyclone dust separators mounted circumferentially of said column with their inlets substantially below said dome means and generally in the reversed stream of gas, a dust bin mounted internally of said product bin and interconnected with said cyclone separators for the separate collection of dust, discharge outlet means for said dust bin, and means for discharging substantially dust free gas from said cyclone separators.

2. A device according to claim 1 in which a deflection shield is mounted circumferentially of said column and adjacent to and below said dome for preventing a direct flow of gas from said dome to product bin.

3. In a device of the class described, a substantially vertical, cylindrical drying column having a lower inlet for a stream of high velocity drying gas and an upper discharge outlet, means adjacent and above said inlet for introducing finely divided solids to be dried into said stream whereby gas and entrained solid is directed upwardly through column, an upper dome separating means mounted above and adjacent said upper outlet for reversing the direction of flow of gas and solid discharging from said outlet and thereby separating product from said gas stream, a concentric product bin encompassing said column and interconnected to said dome means for collecting product separated from said gas stream, a biased planar bottom on said product bin terminating at a low point, discharge means for withdrawing product from said bin, an annular shield mounted on the upper portion of said column below said dome so as to prevent a direct flow of gas into the bottom of said bin, there being a peripheral passage between said shield and said bin, a plurality of cyclone dust collectors mounted below said shield and including inlet means therebelow, a dust bin enclosing a lower portion of said column and enclosed in said product bin, means interconnecting said dust bin with said cyclone separators for the collection of dust, means for discharging dust from said dust bin, and means for discharging gas from said cyclones.

References Cited in the file of this patent

UNITED STATES PATENTS

| 788,741 | Trump | May 2, 1905 |
| 1,550,992 | Trump | Aug. 25, 1925 |
| 1,667,666 | Koon | Apr. 24, 1928 |
| 1,779,734 | Harm | Oct. 28, 1930 |
| 2,034,467 | Haber | Mar. 17, 1936 |
| 2,337,684 | Scheinemann | Dec. 28, 1943 |
| 2,339,923 | Griswold | Jan. 25, 1944 |
| 2,378,542 | Edmister | June 19, 1945 |
| 2,506,273 | Linderoth | May 2, 1950 |
| 2,622,341 | Finnegan | Dec. 23, 1952 |

FOREIGN PATENTS

| 164,602 | Germany | Oct. 31, 1905 |